United States Patent
Olsommer et al.

(10) Patent No.: US 12,240,185 B2
(45) Date of Patent: Mar. 4, 2025

(54) METHOD AND DEVICE FOR SPLICING MULTIFILAMENT TEXTILE FIBERS

(71) Applicant: COMPAGNIE GENERALE DES ETABLISSEMENTS MICHELIN, Clermont-Ferrand (FR)

(72) Inventors: David Olsommer, Clermont-Ferrand (FR); Philippe Berguerand, Clermont-Ferrand (FR); Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 110 days.

(21) Appl. No.: 18/017,152

(22) PCT Filed: Jul. 16, 2021

(86) PCT No.: PCT/FR2021/051328
§ 371 (c)(1),
(2) Date: Jan. 20, 2023

(87) PCT Pub. No.: WO2022/018364
PCT Pub. Date: Jan. 27, 2022

(65) Prior Publication Data
US 2023/0264432 A1    Aug. 24, 2023

(30) Foreign Application Priority Data
Jul. 23, 2020    (FR) ........................................ 2007756

(51) Int. Cl.
*B29C 65/00*    (2006.01)
*B29C 65/14*    (2006.01)
(Continued)

(52) U.S. Cl.
CPC .......... *B29C 65/68* (2013.01); *B29C 65/1406* (2013.01); *B29C 65/4845* (2013.01);
(Continued)

(58) Field of Classification Search
CPC ... B29C 65/4835; B29C 65/542; B29C 65/68; B29C 66/304; B29C 66/69; B29C 66/729
See application file for complete search history.

(56) References Cited

U.S. PATENT DOCUMENTS

| | | | |
|---|---|---|---|
| 4,923,540 | A | 5/1990 | Bom et al. |
| 6,926,853 | B2 | 8/2005 | Hinc et al. |

(Continued)

FOREIGN PATENT DOCUMENTS

| | | |
|---|---|---|
| DE | 2929748 A1 | 2/1981 |
| EP | 1174250 A1 | 1/2002 |

(Continued)

OTHER PUBLICATIONS

International Search Report dated Oct. 6, 2021, in corresponding PCT/FR2021/051328 (4 pages).

*Primary Examiner* — Philip C Tucker
*Assistant Examiner* — Nickolas R Harm
(74) *Attorney, Agent, or Firm* — VENABLE LLP

(57) ABSTRACT

A method for splicing two bundles (1, 2) of multifilament textile fibers comprises: inserting an end portion of a first bundle (1) into a first end of a heat-shrinkable sheath (10) and an end portion of a second bundle (2) into a second end of the sheath, axially opposite the first end, until the ends of the end portions of the two bundles are facing each other; inserting a curable organic material inside the sheath (10) in a space separating the end portions of the bundles (1, 2); heating a portion of the heat-shrinkable sheath (10) surrounding a joining portion (9) to a predetermined temperature; curing the curable organic material; and removing the sheath (10).

14 Claims, 2 Drawing Sheets

(51) Int. Cl.
*B29C 65/48* (2006.01)
*B29C 65/54* (2006.01)
*B29C 65/68* (2006.01)
*B29C 65/78* (2006.01)
*B65H 69/02* (2006.01)
*B65H 69/06* (2006.01)

(52) U.S. Cl.
CPC ........ *B29C 65/542* (2013.01); *B29C 65/7841* (2013.01); *B29C 66/69* (2013.01); *B65H 69/02* (2013.01); *B65H 69/06* (2013.01); *B29C 65/4835* (2013.01); *B29C 66/729* (2013.01); *B65H 2701/312* (2013.01); *B65H 2701/314* (2013.01)

(56) References Cited

U.S. PATENT DOCUMENTS

| | | |
|---|---|---|
| 7,484,949 B2 | 2/2009 | Hinc et al. |
| 10,131,516 B1 | 11/2018 | Reynolds et al. |
| 2003/0015827 A1 | 1/2003 | Hinc et al. |
| 2005/0173823 A1 | 8/2005 | Hinc et al. |
| 2019/0135576 A1 | 5/2019 | Syuto |

FOREIGN PATENT DOCUMENTS

| | | |
|---|---|---|
| FR | 2231264 | 12/1974 |
| JP | 5-239729 A | 9/1993 |

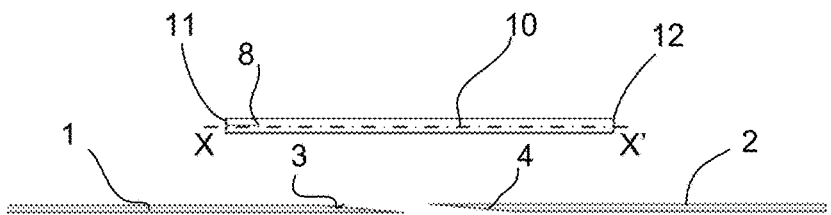
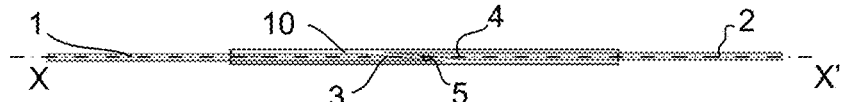
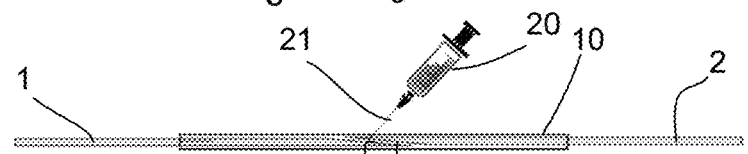
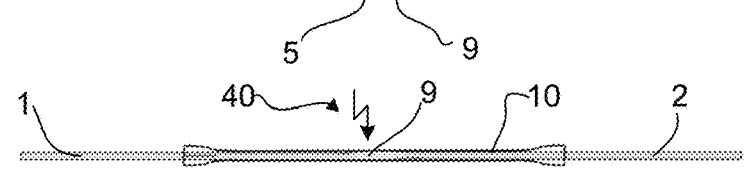
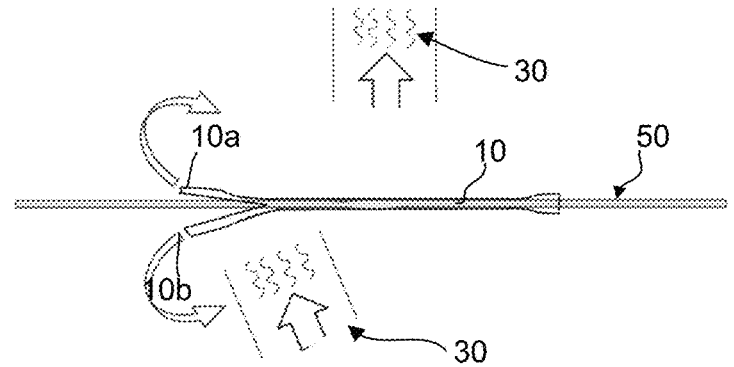
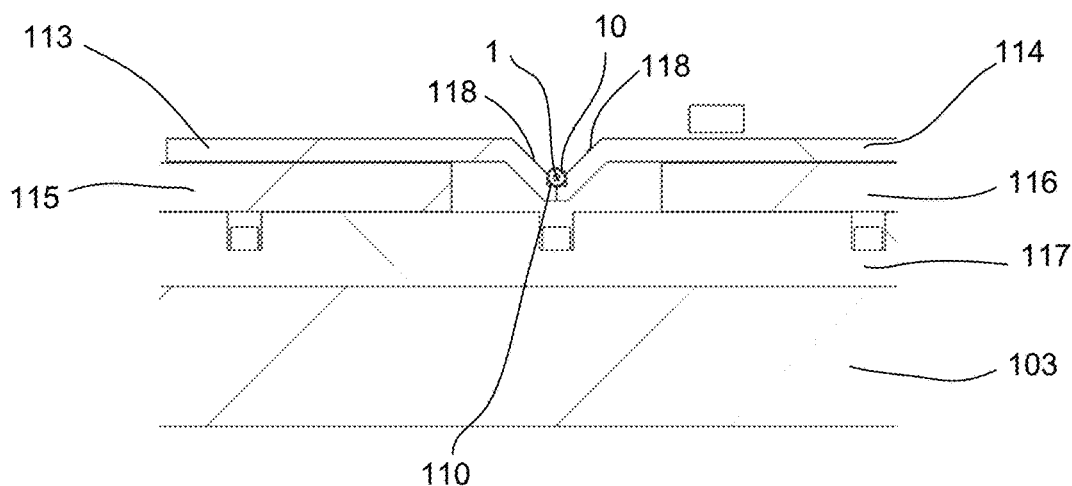
Fig 2

METHOD AND DEVICE FOR SPLICING MULTIFILAMENT TEXTILE FIBERS

BACKGROUND

The present invention relates to methods for continuous manufacturing of elongate composite materials produced by impregnating multifilament textile fibres with a curable composition, and more particularly to a method for splicing such textile fibres before they are impregnated.

EP 1 174 250 describes a method and a facility for continuous impregnation of long fibres with resin in order to manufacture long elongate composite elements, which composite elements comprise reinforcing fibres embedded in a cured resin matrix. The method described comprises a step of drawing a bundle of reinforcing fibres from a fibre storage reel in order to pass it through a vacuum enclosure and then an impregnation chamber where the fibres are impregnated with resin, followed by a step in which the impregnated fibres pass through a calibration die after the shape of the pre-preg has first been stabilized by at least partial polymerization of the resin of the pre-preg. Calibration dies with a predetermined shape and dimensions are also present at the inlet of the vacuum enclosure and before the impregnation chamber. The dies of the facility are all precisely sized as a function of the diameter of the bundle of reinforcing fibres. The facility comprises a pull roll that draws the fibres from the fibre storage reel and a reel for receiving the pre-preg.

Although it operates satisfactorily, it has transpired that replacing an empty storage reel with a new reel requires the complete shutdown of the facility and complete cleaning thereof before it is started up with the new reel in place, which involves significant downtime with negative consequences for productivity. After an operating period of approximately five hours, the fibre storage reel is empty. The facility is then shut down and the empty reel is replaced with a new full reel. The impregnation chamber must then be completely emptied and the facility must be cleaned before it is restarted. This downtime can last between one and three hours. There is therefore an increased need to be able to butt splice the ends of the fibres of one reel to the start of the fibres of a new reel and to join them into a single piece, without completely shutting down the facility.

Various solutions for splicing textile fibres are known in the prior art. Such a solution is described in JP5-239729. According to this document, the end portions of two bundles of glass fibres are first inserted into a circular passage of a splicing device. Compressed air is blown through an air inlet perpendicular to this passage so as to open up the end portions of the glass fibre bundles and mix the glass fibre bundles together. A combined glass fibre bundle is thus obtained. However, it has been noted that the thickness of the combined bundle is greatly enlarged at the join between the two bundles. Such a solution is unsuitable for use in a facility for the continuous manufacturing of elongate composite materials of the type described above, as the thick joining portion cannot fit through the calibration dies of the facility.

Another solution is described in US 2019/0135576, which discloses the use of a flat table for supporting an end portion of a first fibre bundle onto which a roller transfer device deposits the end portion of a second bundle. The end portion of the second bundle is first pulled and then wound around the roller of the transfer device. This roller is then positioned close to the support table and unwinds the end portion of the second bundle, superposing it on the end portion of the first bundle. A thermocompression device is then applied to the superposed end portions of the two bundles, which are thus bonded to form a single bundle. The joining portion of the bundle obtained in this way is undoubtedly less thick than the joining portion obtained by the so-called "expansion" splicing of the preceding document, but it is still too thick to be able to pass through the calibrated orifice of each of the dies of the facility for continuous manufacturing of elongate composite materials described herein.

One aim of the invention is to overcome the drawbacks of the aforementioned documents and provide a novel solution for a method and device for splicing multifilament textile fibres for a facility for continuous manufacturing of elongate composite materials.

SUMMARY

This aim is achieved by the invention, which proposes a method for splicing two bundles of multifilament textile fibres in which:
- an end portion of a first bundle is inserted into a first end of a heat-shrinkable sheath and an end portion of a second bundle is inserted into a second end of the sheath, axially opposite the first end, until the ends of the end portions of the two bundles are facing each other,
- a curable organic material is inserted inside the sheath in a space separating said end portions of the bundles so as to join the end portions together by means of a joining portion, the curable organic material being inserted into the space existing between the ends of the end portions of the two bundles after the bundles have been placed inside the sheath,
- a portion of the heat-shrinkable sheath surrounding the joining portion is heated to a predetermined temperature,
- the curable organic material is cured,
- the sheath is removed.

In other words, the method of the invention makes it possible to butt join the ends of the two bundles of multifilament fibres into a single piece using a precise dose of curable organic material that forms the binder between the two, so as to control the shape and dimensions of the joining portion obtained after the assembly of the two bundles of fibres. The binder is dosed very precisely so as to obtain a sufficiently strong connection, but without increasing the thickness thereof. Also according to the invention, the two bundles are joined inside a heat-shrinkable sheath. Heat-shrinkable sheath is given to mean a flexible tube suitable for tightening when heat is applied thereto. When heated, the sheath thus tightens around the bundles and the binder, holding them firmly in place while the material bonding the bundles cures. This allows the filaments of the bundles not to mix together or change position during assembly and thus provides a continuous bundle, in one piece and with a uniform thickness over the length thereof.

The method of the invention thus makes it possible to splice two bundles of multifilament textile fibres so as to obtain a common bundle having a joining portion with a constant thickness, therefore without any excessive thickness or superposing of the fibres, which allows this single bundle to pass through the different calibration dies of a facility for continuous impregnation of long fibres with resin for the manufacturing of long elongate composite elements. In addition, this method for assembling the end portions of the bundles belonging to two different reels takes little time, in the order of a few minutes, which results in almost continuous operation of the facility, without the need to completely empty the various chambers and compartments thereof, as was the case in the prior art.

The curable organic material is inserted into the space existing between the ends of the end portions of the two bundles so as to form the joining portion after the bundles have been placed inside the sheath. The insertion of the curable organic material into the sheath after the placing of the bundles thus allows improved positioning thereof relative to the ends of the bundles to be spliced. In a preferred embodiment of the invention, the curable organic material is inserted after the placing of the bundles by injection through the sheath, in which case the curable organic material is in a liquid or viscous state before insertion into the sheath and passes to the solid state after the step of the method in which it is cured.

The bundles of multifilament textile fibres assembled using the method of the invention can be identical, in particular, the fibres are made from the same material and have the same linear mass density.

According to the method of the invention, the ends of the end portions of the bundles can be bevel-cut before they are inserted into the sheath. The two facing bevels are parallel and at least partially superposed, which makes their assembly using the curable material even stronger.

The end portion of each bundle can be held in position inside the sheath until said curable organic material cures. This allows precise relative positioning of the elements of the assembly, for the entire duration of the splicing method.

Said heat-shrinkable sheath can be a polyolefin tube.

Said sheath can be transparent to UV radiation and can preferably also be transparent to light.

The heat-shrinkable sheath can be heated by applying a stream of hot air at a temperature higher than the shrinking temperature of the sheath. The heat-shrinkable sheath is preferably a polyolefin tube having a predetermined diameter, greater than the diameter of the bundles to be assembled. Heating with hot air allows the sheath to shrink rapidly and also to cool after blowing has stopped. For a polyolefin sheath, such a temperature can be between 210° C. and 250° C. In one variant, a stream of unheated air is applied after the sheath has shrunk in order to accelerate the cooling thereof.

The heat-shrinkable sheath can be removed by mechanical incision over the length thereof or by heating after the initiation of an incision at one end thereof. In one variant, the sheath is removed by incision over the entire length thereof. In a preferred variant of the invention, an incision is made at one end of the sheath and a stream of hot air is then applied, heated to the same temperature as for shrinking the sheath, which causes the cut to propagate along the length of the sheath and allows the removal of the sheath.

The method of the invention can comprise an additional step of checking the diameter of the join between the two bundles. The diameter of the joining portion can be measured in order to check that it can pass through the calibrated orifice of the dies. The diameter of the joining portion of the two bundles can then be adjusted if necessary, for example by adjusting the quantity of organic material used.

Multifilament textile fibre is given to mean a fibre comprising a plurality of individual textile filaments arranged side by side to form a bundle, the individual fibres of which are unidirectional, being substantially parallel to each other.

The multifilament textile fibres can be selected from the group consisting of glass fibres, carbon fibres, silica fibres, basalt fibres, ceramic fibres, and mixtures of such fibres, preferably from the group consisting of glass fibres, carbon fibres and mixtures of such fibres, and more preferably said multifilament textile fibres can be glass fibres. These fibres are used to produce elongate composites produced by impregnating multifilament textile fibres with a curable composition.

The curable organic material can be heat-curable, preferably crosslinkable, and more preferably a vinyl ester. Curable organic material is given to mean a material comprising, by weight, more than 50%, preferably more than 75%, and more preferably more than 90% curable organic material. This material can thus be a heat-curable polymeric material, for example based on unsaturated polyester, polyepoxide, a derivative of phenol or an aminoplast. Preferably, the curable organic material is crosslinkable. It is for example a resin that can be crosslinked by ionizing radiation, it being possible for the final polymerization to be triggered and controlled easily by means of an ionizing treatment, for example of the UV or UV-visible type. A polyester resin (based on unsaturated polyester) is preferably used as the crosslinkable curable organic material, or more preferably a vinyl ester resin.

Advantageously, the curable organic material used for splicing the multifilament textile fibres according to the invention is the same as the one used for impregnating the fibres during the manufacturing of an elongate composite produced by impregnating multifilament textile fibres with a curable composition.

The aim of the invention is also achieved with a device for splicing two bundles of multifilament textile fibres comprising a table for supporting means for guiding a first bundle and means for guiding a second bundle, arranged so that the end portions of said bundles can be moved relative to means for supporting a heat-shrinkable sheath positioned between the means for guiding the first bundle and the means for guiding the second bundle, so that the end portions of the bundles can be inserted into the sheath when it is held by said supporting means, means allowing the insertion of a predetermined quantity of curable organic material inside the sheath, means for curing said curable organic material and means for heating said heat-shrinkable sheath.

The device according to the invention can comprise means for injecting the curable organic material through said sheath. This makes it possible to position the curable organic material in a precise location preferably situated between the ends of the two bundles. The sheath can be transparent for greater precision.

The device of the invention can comprise means for holding the ends of the bundles in position inside said sheath.

The device can comprise means for holding the ends of the sheath in position.

The device can comprise means for holding the straight portion of the sheath in position, particularly to facilitate piercing by a needle for the injection of the organic material.

Said curable organic material can be a photopolymerizable resin, and said device can comprise a UV lamp.

The device of the invention can form part of a facility for continuous manufacturing of elongate composite materials produced by impregnating multifilament textile fibres with a curable composition, comprising a vacuum chamber, a chamber for impregnation with a curable resin, means for conveying a bundle of multifilament textile fibres through the impregnation chamber and means for polymerizing the resin.

BRIEF DESCRIPTION OF THE FIGURES

The invention will be better understood from the rest of the description, which is supported by the following figures:

FIGS. 1a to 1f are schematic views illustrating the various steps of a method for splicing multifilament textile fibres according to a preferred embodiment of the invention;

FIG. 2 is a cross-sectional view of a part for supporting the sheath forming part of a device for implementing the splicing method of the invention;

DETAILED DESCRIPTION

Figure 3:
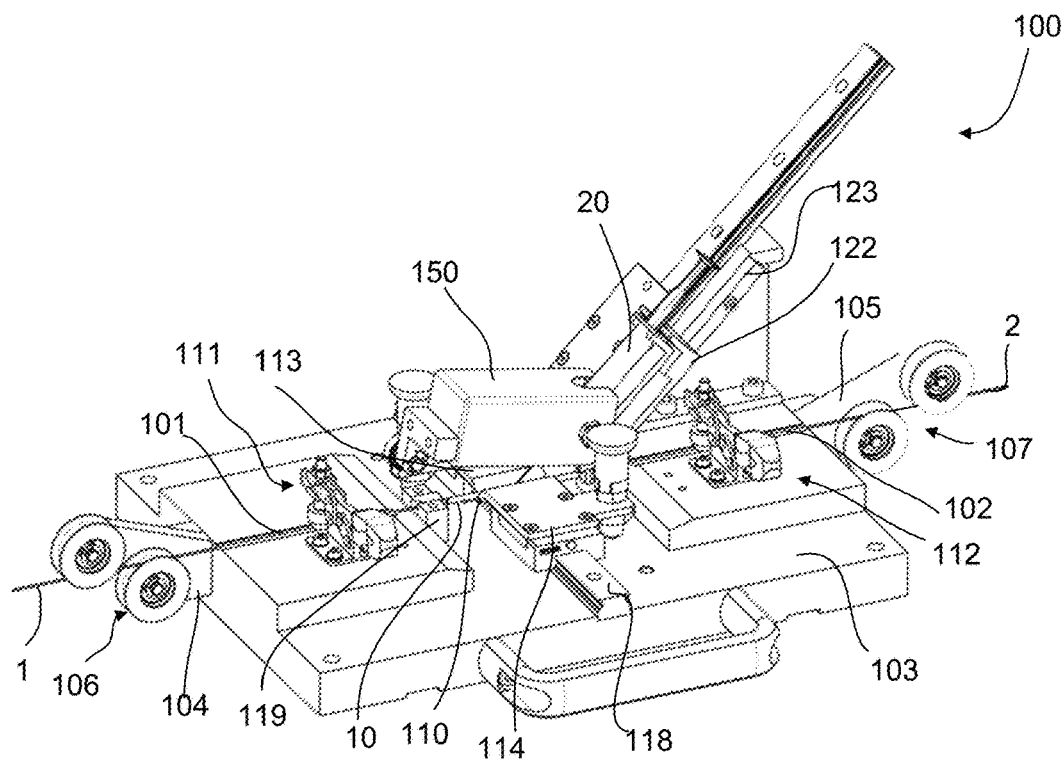
FIG. 3 is a perspective view of a device for implementing the splicing method of the invention illustrated in an operating position.

In the various figures, elements that are identical or similar have the same reference signs. Their description is therefore not systematically repeated.

FIGS. 1a to 1f schematically show the various steps of the method for splicing two bundles 1 and 2 of multifilament textile fibres of the invention. In the example illustrated in the figures, the fibres of the bundles 1 and 2 are glass fibres of 600 tex each. The method of the invention can be used with glass fibres having linear mass densities of between 60 and 9,800 tex, for example. FIG. 1a shows the elements used to carry out the splicing of the invention, in particular two bundles 1 and 2 of multifilament textile fibres and a heat-shrinkable sheath 10. The bundles 1, 2 each have a bevelled end portion 3, 4 respectively. The heat-shrinkable sheath 10 is a generally cylindrical tube having an axis of rotation or longitudinal axis X-X', which tube has two ends 11, 12 and a generally straight shape. In this example, the sheath has an incision 8 of a few mm made at one of its ends 11.

FIG. 1b illustrates the first step of the method, consisting of putting the ends 3 and 4 of the end portions of each bundle 1, 2 into the heat-shrinkable sheath 10. More specifically, the end portion 3 of the first bundle 1 is inserted into a first end 11 of the heat-shrinkable sleeve 10 by sliding it parallel to the longitudinal axis X-X' of the sheath 10 and the end portion 4 of the second bundle 2 is inserted into a second end 12 axially opposite the first, by sliding it parallel to the longitudinal axis of said sheath until the ends 3, 4 of the end portions of the two bundles 1, 2 are facing each other at a predetermined distance forming a space 5 inside the sheath 10.

The heat-shrinkable sheath 10 is preferably a substantially cylindrical tube having a larger diameter than the fibre. The sheath 10 is preferably a tube made from a polyolefin, and more preferably, it is transparent to light and UV rays. The diameter of the sheath 10 is selected so that the bundles of multifilament fibres 1 and 2 can slide inside the sheath and so that, after having been heated, the diameter thereof is smaller than the diameter of the bundles 1, 2 that it encloses. The length of the sheath 10 is also selected so that it can cover the end portions of the two bundles even after its length has shrunk after heating By way of example, with bundles of 600 tex glass fibres, a heat-shrinkable sheath 10 having an inner diameter of between 1.5 and 2.5 mm, preferably equal to 2 mm, is used, with a wall thickness before shrinking of between 0.1 and 0.6 mm, preferably equal to 0.25 mm, and a length of between 40 and 100 mm, preferably equal to 60 mm.

The ends 3, 4 of the bundles 1, 2 are bevel-cut so that they can be superposed while being spaced apart and parallel to each other in the space 5 (FIG. 1b). Preferably, the ends 3, 4 are held in position during the splicing method.

In the second step of the method, as shown in FIG. 1c, a curable organic material is inserted inside the heat-shrinkable sheath 10, preferably sub stantially in the centre of the space 5 existing between the facing ends 3, 4 of the end portions of the two bundles 1, 2, which space is suitable for forming a joining portion 9. In the example described here, the curable organic material is a vinyl ester resin including a photoinitiator. The necessary quantity of resin is inserted into the space 5 inside the sheath 10 using a syringe 20, the needle 21 of which passes through the thickness of the sheath 10 exactly in the location suitable for receiving the resin, as the sheath 10 is transparent. In the case of an automated splicing device, the syringe can advantageously be replaced by a small displacement pump making it possible to inject a precise volume into the sheath 10. In one variant, the sheath is not transparent to light, but it has a mark on its outer wall in the position of the location of the space 5. In another variant, the resin is already inside the sheath 10 before the end portions of the bundles are inserted into the sheath. The device can advantageously comprise a removable or non-removable support for the straight portion of the sheath in order to facilitate the piercing of the sheath by the end of the needle, and prevent the sheath from moving under the needle instead of being pierced by it.

FIG. 1d illustrates the third and fourth steps of the method of the invention. The third step consists of narrowingthe heat-shrinkable sheath 10. In the example described, a blowing device 30 is used, which sends a stream of air heated to a temperature of approximately 210 to 250° C. that is mainly applied to the portion of the sheath 10 surrounding the joining portion 9, and then moving away from the joining portion 9 in order to distribute the resin on either side of the joining portion. The sheath 10 narrows and thus compresses the resin and the ends 3, 4 of the fibres, which ensures satisfactory impregnation of the fibres over a joining portion with small diameter. It can be seen that the sheath 10 has narrowed over most of its length, corresponding to the area that has been heated, with the exception if its ends, to which hot air has not been applied. In one variant, the stream of hot air is applied to the entire length of the sheath 10, starting at one end, 11 (or 12) and progressively heating until the other end 12 (or 11) is reached. A device for holding the straight portion of the sheath 10 is useful during this step to ensure that once the sheath has been heat formed, it is substantially straight, and not randomly curved. The sheath 10 is then left to cool in the ambient air or it is cooled in an accelerated manner with a stream of cold air. It should also be noted that the small incision made by the piercing of the needle 21 closes up as soon as the needle is removed, as the material of the heat-shrinkable sheath 10 is flexible, and this closed-up incision does not result in significant leakage of resin before, during or after the heat-forming operation on the sheath 10.

The fourth step consists of crosslinking the resin using a UV radiation device 40 oriented so that the UV radiation emitted is sent into the joining portion 9 for a predetermined duration, for example of the order of a few seconds. This has the effect of hardening the resin and thus rigidly connecting the ends 3 and 4 of the bundles 1 and 2 of fibres to form a common bundle or single bundle 50.

Once the two bundles 1 and 2 have been connected, the sheath 10 is removed. In one variant, the sheath 10 is removed by making an incision with a tool over the entire length thereof. In another variant, as illustrated in FIG. 1e, either in advance or during the removal operation, a cut is initiated using a cutting tool at one end thereof and a stream of hot air heated to approximately 250° C. is then applied using the blowing device 30 starting from the cut area, which allows the cut to propagate over the length of the sheath 10 and detach it in two portions 10*a* and 10*b*. If necessary, a small gripper can be used to facilitate the removal of the sheath. Again with the aim of facilitating the removal of the sheath, the device for holding the sheath on its straight portion can be moved away during this operation, as will be explained hereinafter with reference to the device of the invention.

The single bundle 50 thus obtained using the splicing method of the invention (FIG. 1*f*) is ready for use in a facility for manufacturing elongate composite materials produced by impregnation with a curable composition, in particular a photopolymerizable vinyl ester resin, in particular of the type described in EP 1 174 250. An operation to check the diameter of the joining portion 9 can be carried out, for example with a two-piece calibrated nozzle, before the single bundle 50 is used in the facility, or using a device for optical measurement of the diameter. This makes it possible to detect any excessive thickness (due for example to incorrect dosing of the quantity of resin inserted into the space 5) and avoid breaking the bundle thus obtained when it is passing through one of the calibrated dies of the facility.

Figure 4:
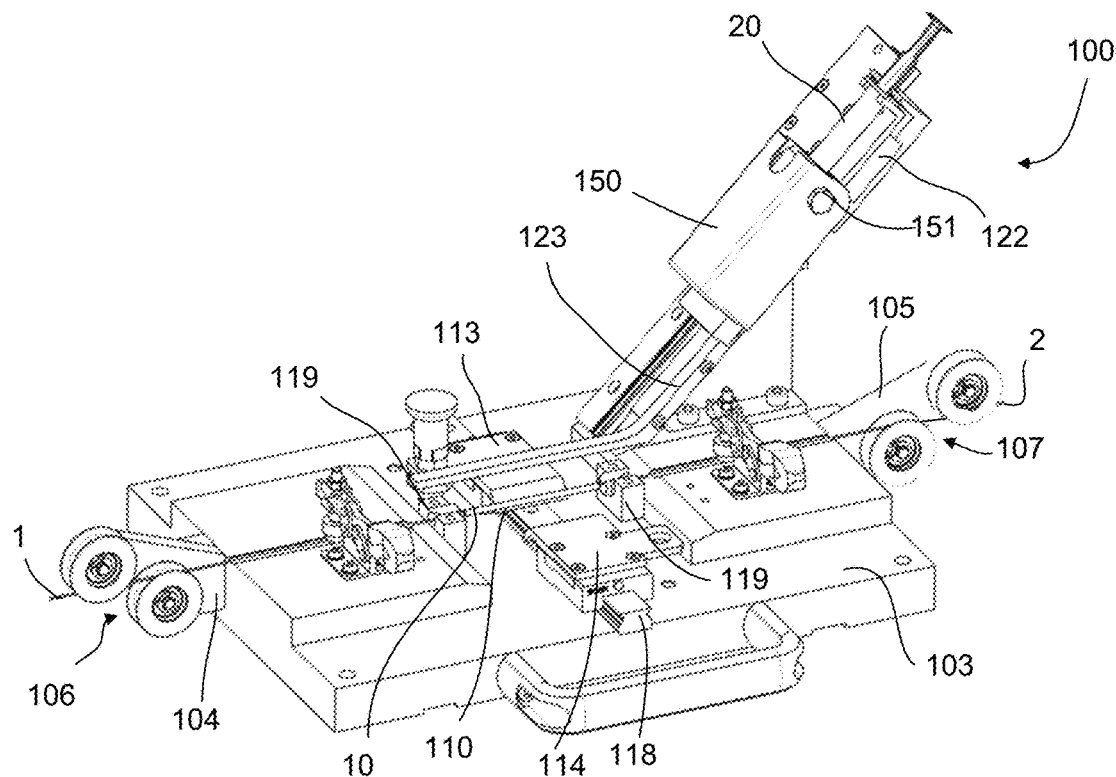
FIG. 4 is a perspective view of the device for implementing the method of the invention illustrated at the end of the splicing method.

FIGS. 2, 3 and 4 illustrate different views of an example of a splicing device 100 of the invention. The device 100 comprises a table 103 for supporting the bundles 1 and 2 to be spliced and a heat-shrinkable sheath 10. More particularly, the table 103 has the general form of a rectangular plate and comprises, at one end thereof, means for guiding a first bundle 1 produced in the form of a groove 101 extending in a longitudinal direction and suitable for receiving the end portion of the first bundle 1, together with a device 111 for holding the bundle 1 in position. The table 103 also comprises means for guiding a second bundle 2 produced in the form of a second groove 102 made in the thickness of the table 103 at the opposite end from the groove 101 in order to receive the end portion of the second bundle 2 held in position, when present, using a second holding device 112. The holding devices 111 and 112 in the example illustrated are toggle fastener devices. In the central portion of the table 103 situated between the two grooves 101 and 102 is a channel 110 that is longitudinally aligned with the grooves 101 and 102 and with the longitudinal axis of the table 103. The channel 110 is suitable for receiving a heat-shrinkable sheath 10 and forms means for supporting it. The table 103 also comprises, at each longitudinal end thereof, a support 104 fora set of rollers 106 for guiding the bundle 1 and a support 105 fora set of rollers 107 for guiding the bundle 2, respectively.

On either side of the channel 110, at each inlet into it, a flared rigid part 119 open at the top is positioned, used to better guide the end 3, 4 respectively of the end portion of each bundle when it is inserted into the sheath 10. More particularly, as seen from above, the part 119 has on its central portion a funnel-shaped opening that is wider at its inlet end for the bundle 1, 2 and narrows at the inlet of the sheath 10. This makes it possible to facilitate the insertion of the end portions of the bundles 1, 2 into the heat-shrinkable sheath 10, which is in this case a cylindrical tube with a constant cross-section over its entire length. In one variant, a cylindrical heat-shrinkable sheath 10 is used the opposite ends of which are flared in order to allow the insertion of the bundles 1, 2.

FIG. 2 is a cross-sectional view through the sheath 10 from the left-hand side thereof, which illustrates how the heat-shrinkable sheath 10 is held in place within the splicing device. The sheath 10 is inserted into the channel 110 having a square cross-section and dimensions close to the diameter of the sheath so that the sheath is held gripped in the channel 110. In order for the sheath 10 to be able to be held gripped in the channel 110, a two-portion sheath support 113, 114 is used, at least one portion (114) of which can slide transversely, making it possible to open and close the channel 110. More specifically, each portion 113, 114 is fixedly mounted on a supporting part 115, 116, at least one (116) of the supporting parts being slidably mounted on a rail 118, in turn fixedly mounted on the table 103, and able to move away from and towards the other (115) when it is translated. The portions 113, 114 are rigid plates each comprising, on the side facing the other, an inclined face 118 opening into the channel 110. The facing inclined faces 118 of the portions 113, 114 thus form a gutter at the bottom of which the channel 110 is located. This makes it possible to ensure that the sheath 10 is held satisfactorily during the splicing operation (FIG. 3), and that the bundle obtained using the method of the invention can be released at the end of the splicing operation (FIG. 4, in which the portion 114 is in the retracted position).

The device 100 also comprises means making it possible to insert a predetermined quantity of curable organic material inside the sheath 10, in particular a syringe 20. The syringe 20 is held by a support 122 that is mounted so that it can slide along an inclined rail 123 in order to make it possible to withdraw the syringe at the end of the operation and to bring it close to the sheath at the start of the operation. A cover 150 for protecting the syringe 20 is held by the support 122, rotatably mounted about a rod 151 of the support 122. During operation, the cover 150 thus moves with the syringe 20 along the inclined rail 123 and is pulled down over the syringe 20 during the injection of the resin and when the syringe 20 is withdrawn. In the case of an automated splicing device, the syringe can advantageously be replaced by a small displacement pump making it possible to inject a precise volume into the sheath 10.

The device 100 further comprises means for heating the heat-shrinkable sheath 10, for example a device for blowing hot air (not shown), capable of sending a stream of air heated to a temperature of between 210° C. and 250° C. towards the sheath 10. The device also comprises means making it possible to cure the resin such as a UV lamp (not shown), which can be a Hönle Bluepoint® lamp and which is applied to the portion of the sheath corresponding to the joining portion 9 for a duration of approximately 10 to 15 s.

During operation, a heat-shrinkable sheath 10 is first positioned in the channel 110. The end portion of a first bundle 1 of glass fibres is inserted, via the groove 101 and the part 119, into one end of the sheath 10, to a predetermined position, preferably close to the centre thereof, and the end portion of the first bundle 1 is fastened in place using the holding device 111. The same thing is done to the other end of the sheath, the end portion of a second bundle 2 of glass fibres being inserted and held in place, after insertion into the sheath 10, using the holding device 112. The portions 113, 114 of the support for the straight part of the sheath 10 are put in position by moving the portion 114 towards the portion 113 so as to grip the sheath 10 in the channel 110. The syringe 20 is then brought close to the sheath 10 and, after the needle 21 has been inserted into the sheath, the plunger of the syringe is actuated in order to insert a predetermined quantity of resin into it. During this operation, the needle 21 of the syringe is protected by the cover 150.

The syringe is then withdrawn to the upper portion of the rail 123, and the protective cover 150 of the needle closes on top of the needle to prevent any risk of injury and to protect the end of the needle from light and UV radiation, and a device for blowing the sheath 10 is then brought close in order to preferably heat the portion of the sheath corresponding to the joining portion into which the resin has been inserted. The sheath 10 shrinks under the effect of the heat and clamps together the ends of the bundles of glass fibres and the resin. After the sheath has cooled, UV radiation is applied to the narrowed portion of the sheath in order to crosslink the resin, which has results in the assembly of the two bundles.

The sheath 10 is then removed. The single bundle 50 obtained by splicing can be removed by lifting, after the end portions of the initial bundles have been released from the hold of the devices 111 and 112. The bundle obtained in this way can be fed into the facility, optionally after the value of the diameter of the joining portion has been checked.

A spliced composite product is thus obtained, having the same mechanical properties as the areas of the bundle outside the spliced areas. The method of the invention thus makes it possible to produce such composite materials without any length limit, which can be particularly advantageous for various applications, for example those that require the splicing of subsea telecommunications cables placed at the bottom of the ocean.

Other variants and embodiments of the invention can be envisaged within the scope of the invention as claimed. The splicing device canthus be independent of the facility, for example portable. The method of the invention can be used with different types of multifilament textile fibre and a first fibre can also be spliced to a second fibre having different properties (for example type, linear mass density) from the first.

In addition, the use of the splicing method and device of the invention with a heat-curable organic material the curing temperature of which is the same as or greater than the temperature applied to narrow the heat-shrinkable sheath can be envisaged. This variant can be particularly advantageous when using non-transparent fibres, such as carbon fibres or basalt fibres which cannot be penetrated to the core by UV radiation.

The invention claimed is:

1. A method for splicing two bundles of multifilament textile fibers comprising:
    inserting an end portion of a first bundle into a first end of a heat-shrinkable sheath and inserting an end portion of a second bundle into a second end of the heat-shrinkable sheath, axially opposite the first end, until ends of the end portions of the first and second bundles are facing each other;
    inserting a curable organic material inside the heat-shrinkable sheath in a space separating the end portions of the first and second bundles so as to join the end portions of the first and second bundles together by means of a joining portion, the curable organic material being inserted into the space existing between the ends of the end portions of the first and second bundles after the bundles have been placed inside the heat-shrinkable sheath;
    heating a portion of the heat-shrinkable sheath surrounding the joining portion to a predetermined temperature;
    curing the curable organic material; and
    removing the heat-shrinkable sheath.

2. The method according to claim 1, wherein the ends of the end portions of the first and second bundles are bevel-cut before they are inserted into the heat-shrinkable sheath.

3. The method according to claim 1, wherein the end portion of each bundle is held in position until the curable organic material cures.

4. The method according to claim 1, wherein the heat-shrinkable sheath is a polyolefin tube.

5. The method according to claim 1, wherein the heat-shrinkable sheath is heated by applying a stream of hot air at a temperature higher than a shrinking temperature of the sheath.

6. The method according to claim 1, wherein the heat-shrinkable sheath is removed by mechanical incision over a length thereof or by heating after initiation of an incision at one end thereof.

7. The method according to claim 1, further comprising checking a diameter of the joining portion of the two bundles.

8. The method according to claim 1, wherein the multifilament textile fibers are selected from the group consisting of glass fibers, carbon fibers, silica fibers, basalt fibers, ceramic fibers, and mixtures thereof.

9. The method according to claim 1, wherein the curable organic material is heat-curable.

10. A device for splicing two bundles of multifilament textile fibers comprising:
    a table for supporting a means for guiding a first bundle and a means for guiding a second bundle, arranged so that end portions of the first and second bundles can be moved relative to a means for supporting a heat-shrinkable sheath positioned between the means for guiding the first bundle and the means for guiding the second bundle, so that the end portions of the first and second bundles can be inserted into the heat-shrinkable sheath when it is held by the means for supporting a heat-shrinkable sheath;
    a means allowing an insertion of a predetermined quantity of curable organic material inside the heat-shrinkable sheath;
    a means for curing the curable organic material; and
    a means for heating the heat-shrinkable sheath.

11. The device according to claim 10, further comprising means for injecting curable organic material through the heat-shrinkable sheath.

12. A facility for continuous manufacturing of elongate composite materials produced by impregnating multifilament textile fibers with a curable composition, the facility comprising:
    a vacuum chamber;
    a chamber for impregnation with a curable resin;
    means for polymerizing the curable resin; and
    the device according to claim 11.

13. The device according to claim 10, further comprising devices for holding the end portions of the first and second bundles in position inside the heat-shrinkable sheath.

14. The device according to claim 10, wherein the curable organic material is a photopolymerizable resin and the device further comprises a UV lamp.

* * * * *